United States Patent
Ohashi et al.

(10) Patent No.: US 8,033,819 B2
(45) Date of Patent: Oct. 11, 2011

(54) MOLD AND MOLDING METHOD

(75) Inventors: Tsuneaki Ohashi, Nagoya (JP);
Masakatsu Inoue, Komaki (JP);
Toshiichi Ikami, Konan (JP); Keiichiro Watanabe, Kasugai (JP); Kunihiko Yoshioka, Nagoya (JP); Kazuhi Matsumoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 162 days.

(21) Appl. No.: 12/243,187

(22) Filed: Oct. 1, 2008

(65) Prior Publication Data
US 2009/0091062 A1     Apr. 9, 2009

(30) Foreign Application Priority Data
Oct. 5, 2007     (JP) ................................. 2007-262361

(51) Int. Cl.
*B29C 45/03* (2006.01)
*B29C 45/18* (2006.01)
*B29C 45/34* (2006.01)

(52) U.S. Cl. .......................... 425/562; 425/569; 425/812

(58) Field of Classification Search ............... 425/450.1, 425/287, 288, 4 R, 562, 569, 812
See application file for complete search history.

(56) References Cited

U.S. PATENT DOCUMENTS

| | | | | |
|---|---|---|---|---|
| 4,479,910 A | * | 10/1984 | Kurokawa et al. | 264/2.5 |
| 4,540,534 A | * | 9/1985 | Grendol | 264/2.2 |
| 4,554,126 A | * | 11/1985 | Sera | 264/272.17 |
| 5,928,682 A | * | 7/1999 | Janca et al. | 425/566 |
| 2002/0115237 A1 | * | 8/2002 | Williams | 438/126 |
| 2003/0072839 A1 | * | 4/2003 | Seki et al. | 425/542 |
| 2004/0192822 A1 | * | 9/2004 | Shirai et al. | 524/445 |
| 2007/0087079 A1 | * | 4/2007 | Murugan | 425/572 |

FOREIGN PATENT DOCUMENTS

| | | |
|---|---|---|
| EP | 0 506 004 A1 | 9/1992 |
| JP | 61-185426 A1 | 8/1986 |
| JP | 64-004617 U1 | 1/1989 |
| JP | 03-039218 A1 | 2/1991 |
| JP | 04-016303 A1 | 1/1992 |
| JP | 04-135820 A1 | 5/1992 |
| JP | 04-298316 A1 | 10/1992 |
| JP | 07-290514 A1 | 11/1995 |
| JP | 2003-098852 A1 | 4/2003 |
| JP | 2004-058494 A1 | 2/2004 |

OTHER PUBLICATIONS

U.S. Appl. No. 12/392,363, filed Feb. 25, 2009, Yoshioka et al.

* cited by examiner

*Primary Examiner* — Joseph Del Sole
*Assistant Examiner* — Ryan Ochylski
(74) *Attorney, Agent, or Firm* — Burr & Brown

(57) ABSTRACT

A mold includes a gate communicating with the entire perimeter of a cavity serving as a space configured to form a molded article. A self-curable molding material with flowability is fed into the perimeter of the cavity through the gate; hence, the mold has a small number of dead ends compared with the case where, for example, the molding material is fed into the cavity through a part of the cavity, preventing the formation of bubbles left in the cavity. The arrangement of a gate and a vent each making an acute angle results in the spontaneous separation of the molded article in the cavity from solidified material portions in the gate and the vent due to shrinkage on curing.

15 Claims, 10 Drawing Sheets

36B

36C

MOLD AND MOLDING METHOD

BACKGROUND OF THE INVENTION

1. Field of the Invention

The present invention relates to a mold and a molding method.

2. Description of the Related Art

For example, Japanese Unexamined Patent Application Publication No. 2004-58494 discloses a mold including a seamless frame-like cavity serving as a space corresponding to a molded article and a gate serving as a space configured to feed a urethane raw material, the cavity and the gate being located at a mating surface of the mold formed of an upper segment and a lower segment, and an outlet gap arranged at the edge of a confluent portion where the flows of the injected urethane raw material merge in the cavity. The raw material fed through a runner is uniformly injected into the cavity through the gate narrower than the runner. This results in the prevention of the formation of bubble inclusion and surface voids and underfilling.

SUMMARY OF THE INVENTION

However, in the case of using the mold described in Japanese Unexamined Patent Application Publication No. 2004-58494, although the raw material is fed into the cavity through the gate narrower than the runner, the mold is not sufficient for the uniform injection of the raw material into the cavity because the raw material is fed through part of the cavity, thereby causing bubble inclusion, the formation of voids, and underfilling in the cavity, in some cases. Furthermore, the mold does not have a structure suitable for the separation of a solidified material portion in the gate from a molded article in the cavity after molding. Thus, in some cases, it is difficult to separate the solidified material portion in the gate from the molded article in the cavity. Moreover, a curing reaction can proceed during the feeding of the raw material. The gel-like urethane raw material due to the curing reaction flows inside the cavity, thus easily causing bubble inclusion, the formation of voids, and underfilling when the cavity has a complicated shape or a minute structure.

In the mold described in Japanese Unexamined Patent Application Publication No. 2004-58494, the gate is arranged at or near the bottom of the cavity, and a vent is arranged at or near the top. The molding material is fed upward, thus preventing the inclusion of relatively large bubbles. However, an inlet is located on the side of the cavity at a level equal or substantially equal to the bottom; hence, the inclusion of small bubbles formed in feeding the molding material occurs in some cases. In addition, in the case where the mold includes the inlet arranged at a position higher than the top of the cavity, the gate is arranged at or near the top of the molded article, and the vent is arranged at or near the bottom of the molded article; hence, in some cases, dead-ends are formed by the mold and the molding material, causing bubble inclusion.

In consideration of the above circumstances, it is an object of the present invention to provide a mold capable of preventing bubble inclusion in feeding a molding material into a cavity and to provide a molding method. It is another object of the present invention to provide a mold in which a solidified material portion in a gate is easily separated from a molded article in a cavity and to provide a molding method. It is another object of the present invention to provide a mold configured to form a plurality of molded articles and a molding method, the mold being capable of yielding the plurality of molded articles having uniform quality regardless of the position in the mold.

To achieve at least one of the objects, the present invention provides the following mold and method.

The present invention is directed to a mold configured to form at least one molded article having a predetermined shape by injecting a flowable self-curable molding material including:

a cavity serving as a space configured to form a molded article by injecting the molding material, and a gate communicating with the perimeter of the cavity and serving as a space configured to feed the cavity with the molding material.

In this mold, the gate communicates with the perimeter of the cavity serving as a space configured to form a molded article. The flowable self-curable molding material is fed into the cavity through the gate; hence, the mold has a small number of dead ends compared with the case where, for example, the molding material is fed into the cavity through a part of the cavity, preventing the formation of bubbles left in the cavity in feeding the molding material into the cavity. The phrase "communicates with the perimeter of the cavity" defined here indicates that the gate communicates with the entire or substantially entire perimeter of the cavity. In particular, preferably, the gate having a surface being in contact with the cavity communicates with substantially the entire perimeter of the cavity. More preferably, the gate communicates with the entire perimeter of the cavity.

In the mold according to the present invention, the gate may be formed so as to communicate with the bottom of the cavity. In this case, an inlet arranged at a position higher than the top of the cavity may be arranged, the inlet being configure to feed the molding material into the gate.

The mold according to the present invention may include a vent communicating with the top of the at least one cavity and serving as a space configured to partially discharge the molding material from the at least one cavity and an inlet arranged at a position higher than the top of the at least one cavity and configured to feed the at least one gate with the molding material. In this mold, the gate may be formed so as to communicate with the bottom of the at least one cavity.

In this mold, when the flowable self-curable molding material is fed into the inlet arranged at a position higher than the top of the cavity serving as a space configured to form the molded article, the molding material is fed into the cavity through the gate arranged at the bottom of the cavity. The cavity is filled with the molding material, and then the molding material is fed into the vent communicating with the cavity at the top of the cavity and serving as a space configured to partially discharge the molding material from the cavity. In the early stage of the feeding, the pressure loss at the gate is large. Thus, the gate and lines up to the gate are easily filled with the molding material before the cavity is fed with the molding material. When the molding material is fed into the cavity, the feeding rate of the molding material into the cavity is sufficiently low to generate a laminar flow. The molding material is fed into the cavity through the bottom of the cavity, thus preventing bubble inclusion. In this way, the cavity is filled with the bubble-free molding material from the bottom toward the top while air in the cavity is being replaced with the molding material from the bottom of the cavity. This assuredly maintains the path for evacuating air above the surface of the molding material, preventing the formation of bubbles left in the cavity. Hitherto, in the case where a plurality of cavities are arranged, bubbles formed in the vicinity of the cavities adjacent to the inlet flow into the cavities remote from the inlet, in some cases. According to the invention, bubbles are difficult to form. If bubbles are formed, the bubbles are evacuated to the vents communicating with the respective cavities. Thus, the bubbles do not flow into other cavities located in a downstream direction. That is, the bubble inclusion is caused by two factors: the turbulent flow of the molding material, and the trapping of bubbles by the mold and the molding material. The invention inhibits both factors. The term "bottom" indicates a portion located lower than the middle of the cavity. The term "bottom" may be defined as a predetermined range including the bottom of the cavity. Alternatively, the term "bottom" may be defined as a portion near the bottom of the cavity. The term "top" indicates a portion located higher than the middle of the cavity. The term "top" may be defined as a predetermined range including the top of the cavity. Alternatively, the term "top" may be defined as a portion near the top of the cavity. The gate may be configured to feed the molding material into the cavity while air in the cavity is being replaced with the molding material. The vent may be configured to evacuate air in the cavity and partially eject the molding material from the cavity.

In this case, the gate may be formed so as to communicate with the perimeter of the cavity. The vent may be formed so as to communicate with the perimeter of the cavity.

In the mold according to the present invention, the gate may have a connecting portion that communicates with the cavity, and the connecting portion is formed so as to have the smallest volume in the gate. The molded article shaped in the cavity is also referred to as a "molded article in the cavity". A solidified material portion shaped in the gate is also referred to as a "gate-solidified material portion". The term "connecting portion" is a portion relating to stress concentration. The connecting portion may be formed on a desired fracture surface. The term "minimum volume" may indicate the minimum height or width of the gate.

In the mold according to the present invention, the gate may be formed of a tapered surface such that the volume of the gate decreases with decreasing distance from the cavity. In the mold according to the present invention, the gate may have a connecting portion that communicates with the cavity, the connecting portion being formed so as to make an acute angle with the cavity. The mold according to the present invention may include a plurality of segments configured to form the cavity when the plurality of segments are combined, in which the plurality of segments are combined to form the cavity, the gate may be defined by a surface of at least one of the plurality of segments and a surface of another segment facing each other. The mold according to the present invention may include a runner serving as a space through which the molding material is fed into the gate, in which the runner communicates with the whole or part of the perimeter of the gate.

In the mold according to the present invention, the runner may have a step at a communicating portion at which the runner communicates with the gate. In the mold according to the present invention, the gate and the runner may be formed so as to satisfy the expression (1):

$$Lr \geq 5 \times Lg \quad \text{expression (1)}$$

where Lg (mm) represents the minimum dimension of the gate, and Lr (mm) represents the minimum dimension of the runner. The phrase "minimum dimension of the gate" indicates a dimension relating to the pressure loss of the molding material and the smallest length among the height, width, diameter, and the like of the gate through which the molding material passes. The phrase "minimum dimension of the runner" indicates a dimension relating to the pressure loss of the molding material and the smallest length among the height, width, diameter, and the like of the runner through which the molding material passes.

In this case, the gate and the runner may be formed so as to satisfy at least one of the following requirements: the gate having a minimum dimension Lg of 0.5 mm or less and the runner having a minimum dimension Lr of 1 mm or more. The gate preferably has a minimum dimension Lg of 0.01 mm to 0.5 mm and more preferably 0.05 mm to 0.3 mm. The runner preferably has a minimum dimension Lr of 1 mm to 10 mm and more preferably 1 mm to 5 mm.

The mold according to the present invention may include a vent communicating with the perimeter of the cavity and serving as a space configured to evacuate air left in the cavity and partially discharge the molding material from the cavity. The phrase "communicating with the perimeter of the cavity" indicates that the vent communicates with the entire or substantially the entire perimeter of the cavity. In particular, preferably, the gate having a surface being in contact with the cavity or the vent communicating with a corner of the cavity communicates with substantially the entire perimeter of the cavity and more preferably the entire perimeter of the cavity. In this case, the vent may be formed so as to communicate with the top of the cavity. The gate may be formed so as to communicate with the bottom of the cavity. The vent may be formed so as to communicate with the top of the cavity.

In the mold including the vent according to the embodiment of the invention, the vent may have a connecting portion that communicates with the cavity, and the connecting portion may be formed so as to have the smallest volume in the vent. A solidified material portion in the vent is also referred to as a "vent-solidified material portion". The term "connecting portion" is a portion relating to stress concentration. The connecting portion may be formed on a desired fracture surface. The term "minimum volume" may indicate the minimum height or width of the vent. In the mold including the vent according to the embodiment of the invention, the vent may be formed of a tapered surface such that the volume of the vent decreases with decreasing distance from the cavity. In the mold including the vent according to the embodiment of the invention, the vent may have a connecting portion that communicates with the cavity, the connecting portion being formed so as to make an acute angle. The mold including the vent according to the embodiment of the invention may include a plurality of segments configured to form the cavity when the plurality of segments are combined, in which when the plurality of segments are combined to form the cavity, the vent is defined by a surface of at least one of the plurality of segments and a surface of another segment facing each other.

The present invention is directed to a method for molding an article with a self-curable molding material and a mold, including the steps of:

feeding a molding material satisfying the following expression (2) into the mold according to claim 1, $$Rs \geq \sigma s/(Em+\sigma s) \quad \text{expression (2)}$$

where Rs represents the cure shrinkage rate of the molding material, σs (Pa) represents the tensile strength of the molded article composed of the cured molding material, and Em (Pa) represents the Young's modulus of the molded articles composed of the cured molding material; and curing the molding material in the mold.

According to this molding method, the self-curable molding material satisfying the expression (2) is fed into one of the molds described above, and then the molding material in the mold is cured. In the case of satisfying the expression (2), it is possible to assuredly separate the molded article in the cavity from the gate-solidified material portion due to shrinkage on curing. The cure shrinkage rate Rs is determined by forming a molded article for measurement of the cure shrinkage rate with a mold having a simple shape such as a cylinder for measurement of the cure shrinkage rate under conditions (e.g., the material and surface conditions of the mold, the molding material, curing time, and curing temperature) the same as those in the case of actual molding, subtracting a representative dimension R1 after curing from a representative dimension R0 before curing (R0 is equal to the representative dimension of the inner dimension of the cavity. For example, when the cavity has a cylindrical shape, the radius serves as the representative dimension), and dividing the resulting difference by the representative dimension R0 before curing. For example, for a shape in which cylinders having different diameters are connected in the axial direction, a domical shape, a hemispherical shape, or a shape in which the through hole has different diameters between the upper portion and the lower portion, the radius of the largest portion is defined as the representative dimension. In this case, in the feeding step, the molding material further satisfying the following expression (3) may be fed into the mold, $$Li \times Rs \geqq 50 \times 10^{-6} \qquad \text{expression (3)}$$

where Li (m) represents the distance from the center of the molded article to the periphery of the gate immediately after the molding material is fed into the mold.

Alternatively, the present invention is directed to a method for molding an article with a self-curable molding material and a mold, including the steps of:

feeding a molding material satisfying the following expression (3) into the mold according to claim 1, $$Li \times Rs \geqq 50 \times 10^{-6} \qquad \text{expression (3)}$$

where Rs represents the cure shrinkage rate of the molding material, and Li (m) represents the distance from the center of the molded article to the periphery of the gate immediately after the molding material is fed into the mold; and curing the molding material in the mold.

In this molding method, the self-curable molding material satisfying the expression (3) is fed into one of the molds described above, and then the molding material in the mold is cured. In the case of satisfying the expression (3), a sufficient change in the dimension of the molding material due to shrinkage on curing is obtained even when the stresses are relieved by plastic deformation in the course of shrinkage on curing, thereby assuredly separating the molded article in the cavity from the gate-solidified material portion.

BRIEF DESCRIPTION OF THE DRAWINGS

FIG. 5A is an explanatory drawing of the mold 10 immediately after the initiation of feeding, FIG. 5B is an explanatory drawing of the mold 10 in the course of feeding, and FIG. 5C is an explanatory drawing of the mold 10 after the completion of feeding;

FIG. 6A illustrates the removal of the mold segments, and FIG. 6B is a conceptual drawing of molded articles and solidified material portions after curing;

FIG. 7A is an explanatory drawing of a connecting portion 24B, FIG. 7B is an explanatory drawing of a connecting portion 24C, and FIG. 7C is an explanatory drawing of a connecting portion 24D;

FIG. 8A is an explanatory drawing of a connecting portion 46B, FIG. 8B is an explanatory drawing of a connecting portion 46C, FIG. 8C is an explanatory drawing of a connecting portion 46D, FIG. 8D is an explanatory drawing of a connecting portion 46E, and FIG. 8E is an explanatory drawing of a connecting portion 46F;

FIG. 9A is an explanatory drawing of a step 36B, FIG. 9B is an explanatory drawing of a step 36C, FIG. 9C is an explanatory drawing of a structure without a step.

DETAILED DESCRIPTION OF THE INVENTION

Figure 1:
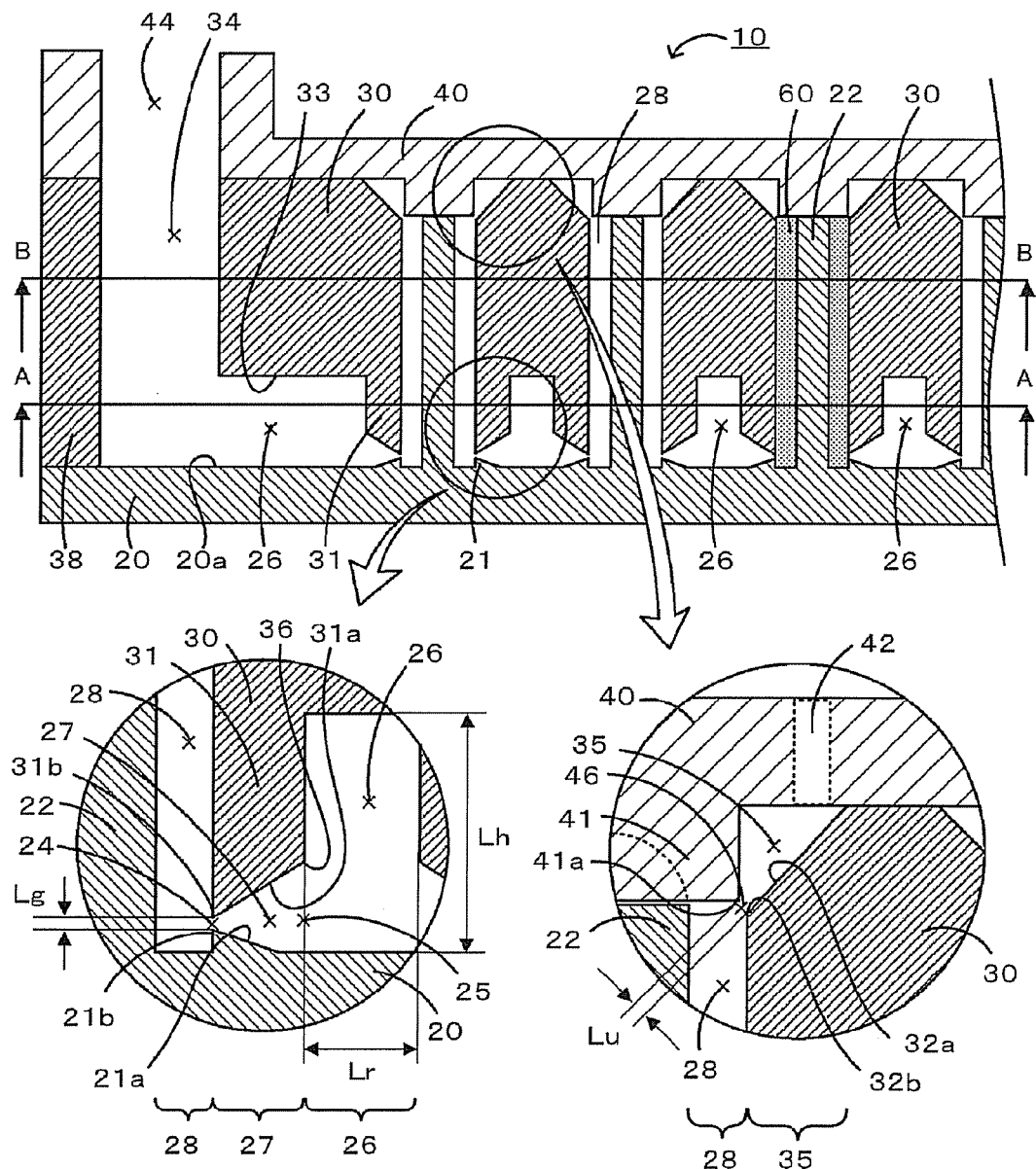
FIG. 1 schematically shows a mold 10 according to an embodiment of the present invention.
Figure 2A:
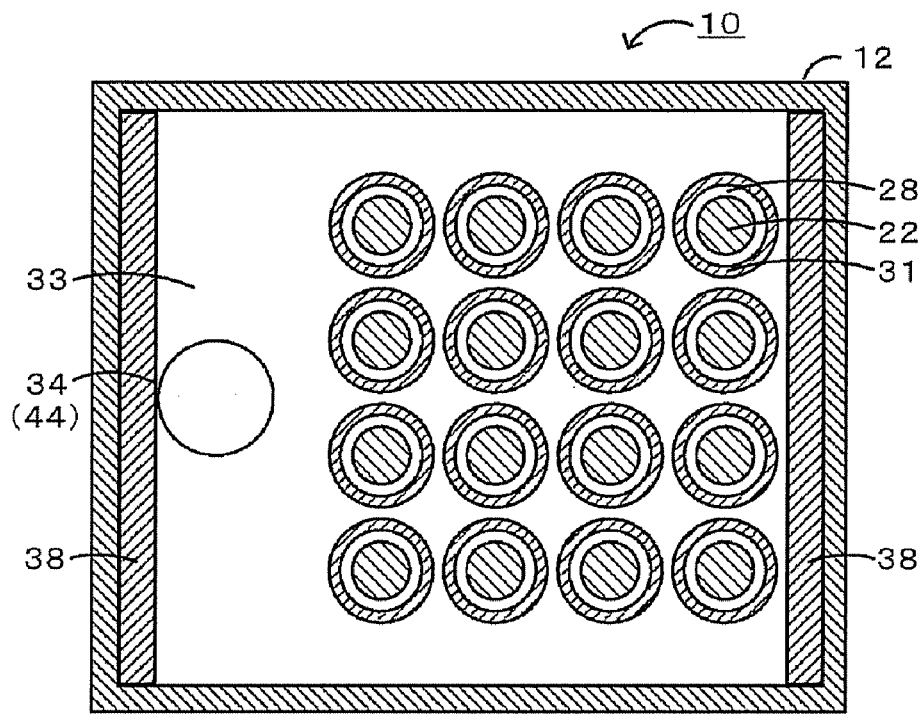
FIG. 2A is a cross-sectional view of the mold 10 taken along line IIA-IIA in FIG. 1.
Figure 2B:
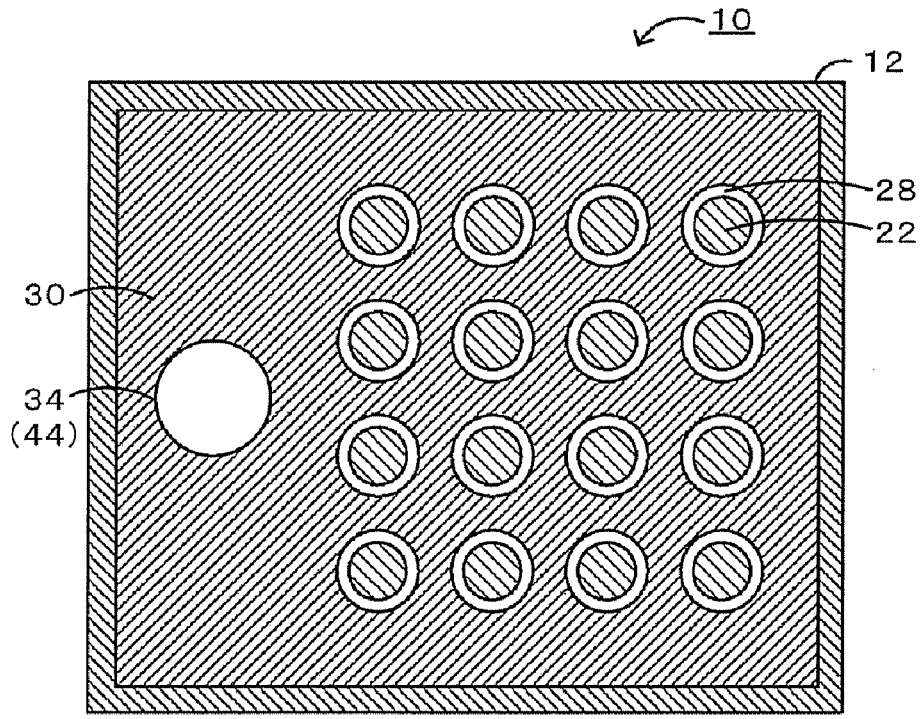
FIG. 2B is a cross-sectional view of the mold 10 taken along line IIB-IIB in FIG. 1.
Figure 3:
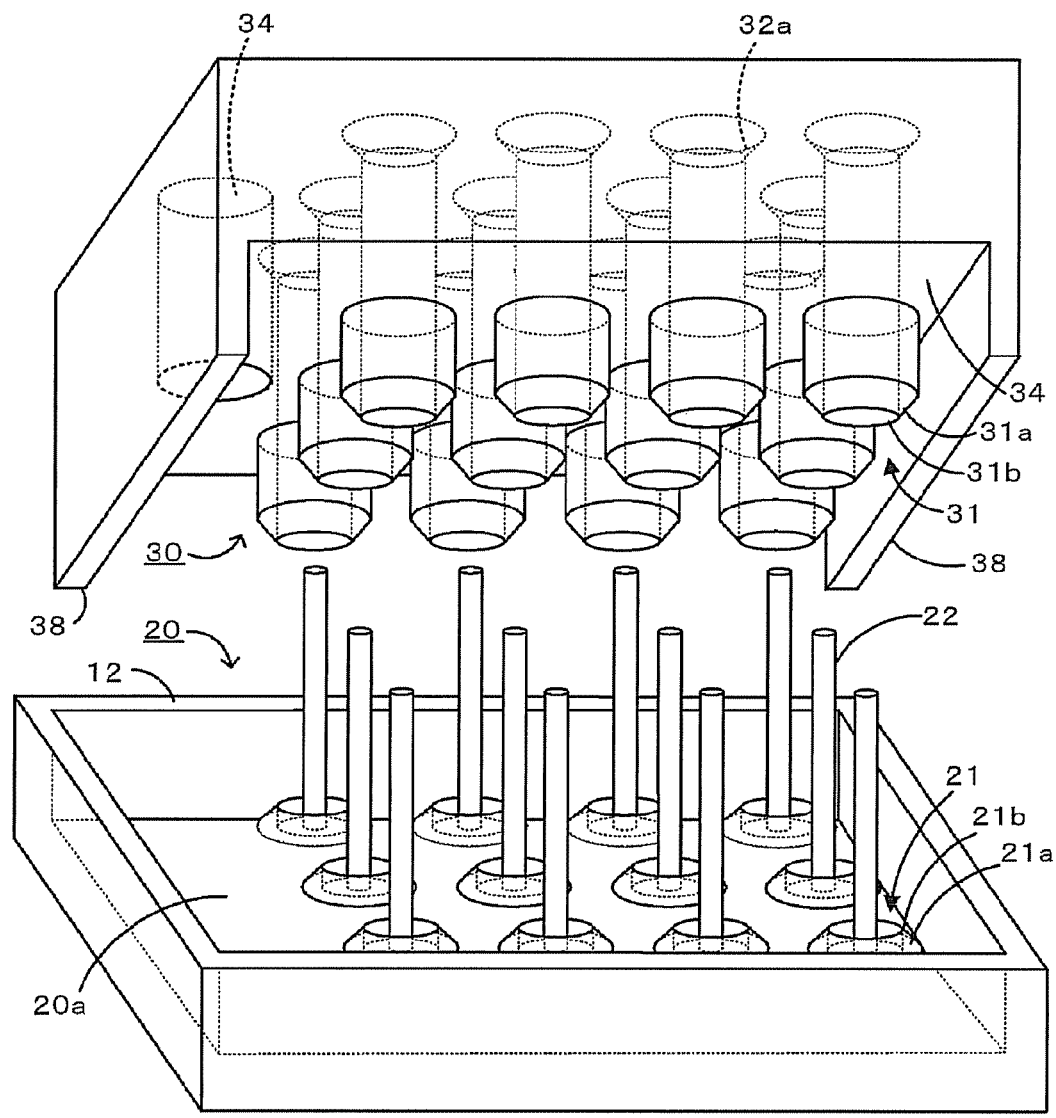
FIG. 3 is a perspective view of a lower segment 20 and an intermediate segment 30.
Figure 4:
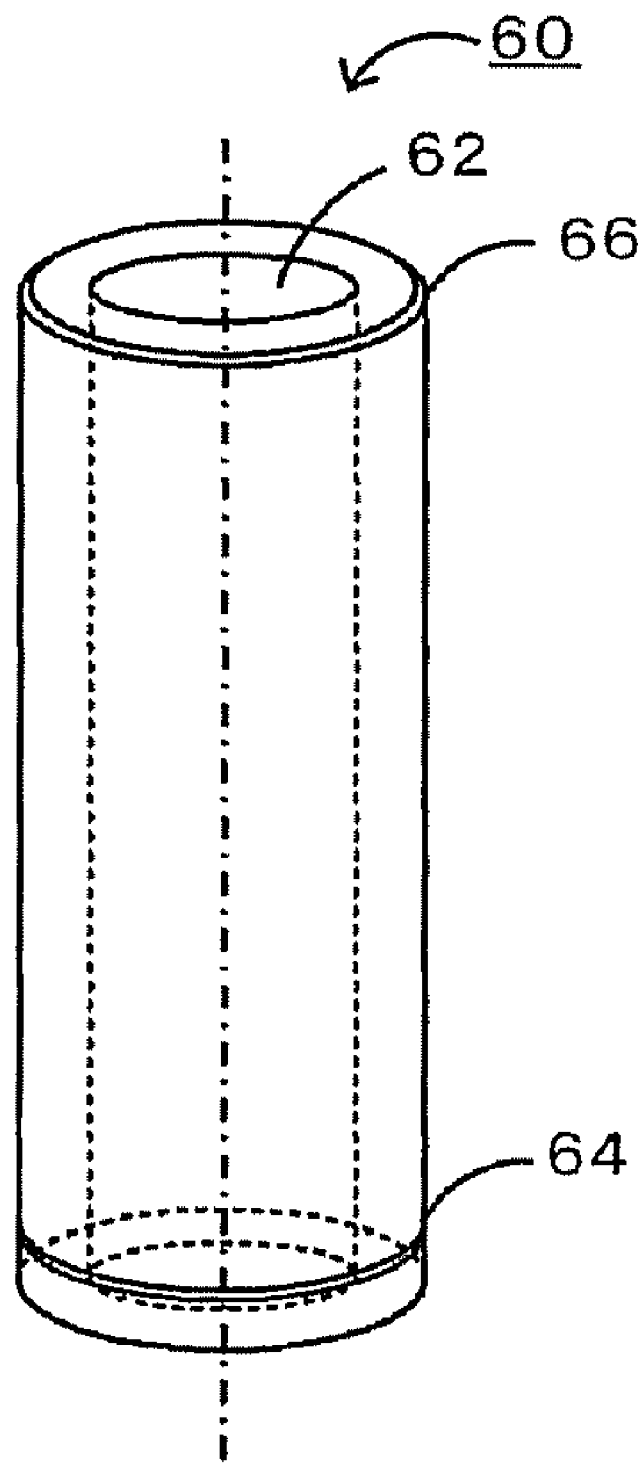
FIG. 4 is a perspective view of a molded article 60 with the mold 10.

Best modes for carrying out the invention will be described with reference to the attached drawings. FIG. 1 schematically shows a mold 10 according to an embodiment of the present invention. FIG. 2A is a cross-sectional view of the mold 10 taken along line IIA-IIA in FIG. 1, and FIG. 2B is a cross-sectional view of the mold 10 taken along line IIB-IIB in FIG. 1. FIG. 3 is a perspective view of a lower segment 20 and an intermediate segment 30. FIG. 4 is a perspective view of a molded article 60 produced with the mold 10. The mold 10 is used to form the molded article 60, which is a hollow cylinder (see FIG. 4), as shown in FIG. 1. The mold 10 includes the lower segment 20, the intermediate segment 30, and an upper segment 40, which are mold members. For convenience, FIG. 1 partially shows the molded article 60 indicated by the dot pattern. Furthermore, while FIG. 1 shows a mold to form a plurality of molded articles 60 (for example, (12 molded articles), a mold to form any number of molded articles 60 may be used. The molded article 60 formed with the mold 10 will be described below.

The molded article 60 is a cylindrical member composed of an inorganic powder before sintering and having a through hole 62 passing between the top and bottom thereof as shown in FIG. 4. The molded article 60 is formed by gel casting with a self-curing molding material (e.g., a slurry) mainly composed of an inorganic powder, such as an alumina powder or a carbon powder. The molded article 60 has a gate mark 64 on the periphery near the bottom thereof and a vent mark 66 on the periphery near the top thereof. Each of the gate mark 64 and the vent mark 66 is formed in the form of a nondescript groove or ridge at a nonproblematic position as a product. The molded article 60 is a brittle ceramic green compact but has sufficient handling strength.

The lower segment 20 of the mold 10 has a rectangular shape in contour and is arranged at the bottom of the mold 10 as shown in FIGS. 1, 2A, and 2B. Projections 21 each having a first tapered surface 21a rising from the outer perimeter toward the inner edge 21b thereof are arranged at predetermined intervals on the upper face 20a of the lower segment 20 and at positions at which the molded articles 60 will be formed. A column 22 extending upward is arranged in the middle of a corresponding one of the projections 21 on the upper face 20a of the lower segment 20. The column 22 is formed so as to have an outer diameter corresponding to the inner diameter of the through hole 62 of the molded article 60. In this case, the projections 21 and the columns 22 are arranged in a lattice pattern but may be arranged in a staggered pattern.

The intermediate segment 30 has a rectangular shape in contour and is arranged above the lower segment 20. The intermediate segment 30 has cylindrical portions 31 on the lower face 33 side at predetermined intervals, each of the cylindrical portions 31 having a through hole passing between the upper face and the lower face of the intermediate segment 30. The through holes are formed so as to have an inner diameter corresponding to the outer diameter of the molded articles 60. The cylindrical portions 31 are arranged at the respective molded articles 60. Each of the cylindrical portions 31 has a second tapered surface 31a and tapers to an edge 31b having an acute angle to the corresponding inner surface. In this case, the cylindrical portions 31 are arranged in a lattice pattern but may be arranged in a staggered pattern. As shown in FIGS. 2A and 3, the lower face 33 of the intermediate segment 30 serves as the ceiling of a runner through which a molding material flows when the mold 10 is assembled and used. The intermediate segment 30 has third tapered surfaces 32a having a mortar-like shape on the upper face thereof, the mortar-shaped third tapered surfaces 32a being centered around the respective through holes formed in the cylindrical portions 31. An feed channel 34, which is a through hole, is arranged on the left side of the intermediate segment 30 shown in FIG. 1. Walls 38 are vertically arranged on the left and right sides of the intermediate segment 30 shown in FIG. 1. The walls 38 are designed to be located at a level such that the distance between the edge 31b of the corresponding cylindrical portion 31 and the inner edge 21b of the corresponding projection 21 is Lg when the walls 38 are in contact with the upper face 20a of the lower segment 20. Each of the columns 22 of the lower segment 20 is designed to have a diameter smaller than the inner diameter of the through hole of a corresponding one of the cylindrical portions 31 by a value corresponding to the wall thickness of the molded article 60 and is also designed in such a manner that the top face of each column 22 is located slightly higher than a plane corresponding to the bottom face of a corresponding one of the mortar-shaped third tapered surfaces 32a when the walls 38 are in contact with the upper face 20a of the lower segment 20.

The upper segment 40 has a rectangular shape in contour and is arranged on the intermediate segment 30. The upper segment 40 has cylindrical portions 41 having a cylindrical shape on the lower face thereof, the cylindrical portions 41 being arranged at positions where the molded articles 60 will be formed. The cylindrical portions 41 are designed in such a manner that undersurfaces of the cylindrical portions 41 are located on the plane corresponding to the bottoms of the mortar-shaped third tapered surfaces 32a when the upper segment 40 is arranged on the intermediate segment 30. Furthermore, the cylindrical portions 41 are designed to have a diameter slightly smaller than the inner diameter of the through holes of the cylindrical portions 31 in such a manner that the distance Lu between each of corners 41a and the edge 32b of a corresponding one of the third tapered surfaces 32a is formed when the upper segment 40 is arranged on the intermediate segment 30. The cylindrical portions 41 have depressions in the undersurfaces thereof in such a manner that tops of the columns 22 formed on the lower segment 20 can be inserted into the depressions in view of the height precision of the column 22. Air vents 42, which are through holes for releasing air in feeding the molding material, are arranged in the vicinity of the cylindrical portions 41. An inlet 44, which is a through hole having the same diameter as that of the feed channel 34, is formed above the feed channel 34 of the intermediate segment 30 on the left side of the upper segment 40 shown in FIG. 1.

The lower segment 20, the intermediate segment 30, and the upper segment 40 are formed in such a manner that the following spaces are formed inside the mold 10 when the lower segment 20, the intermediate segment 30, and the upper segment 40 are assembled into the mold 10 as shown in FIG. 1. The intermediate segment 30 is combined with the lower segment 20 to bring the walls 38 of the intermediate segment 30 into contact with the upper face 20a of the lower segment 20, so that the distance between the edge 31b of each cylindrical portion 31 and the inner edge 21b of a corresponding one of the projections 21 is Lg, and each column 22 of the lower segment 20 is inserted in the middle of the through hole of a corresponding one of the cylindrical portions 31 of the intermediate segment 30. The intermediate segment 30 is combined with the upper segment 40 to bring the upper face of the intermediate segment 30 into contact with the lower face of the upper segment 40, so that each of the cylindrical portions 41 is inserted in the middle of a corresponding one of the mortar-shaped third tapered surfaces 32a formed on the upper face of the intermediate segment 30 in such a manner that each cylindrical portion 41 has the same central axis as the corresponding third tapered surface 32a. Thus, the upper faces of the columns 22 are located on the underside of the cylindrical portions 41. As a result, a cavity 28 having the same shape as the molded article 60 and serving as a space having a cylindrical shape is formed between the outer periphery of each column 22 and the inner periphery of a corresponding one of the cylindrical portions 31 and between the upper face of the lower segment 20 and the undersurface of a corresponding one of the cylindrical portions 41. The intermediate segment 30 is combined with the upper segment 40 to allow the feed channel 34 of the intermediate segment 30 to communicate with the inlet 44 of the upper segment 40. This results in the formation of an inlet for feeding a molding material and makes it possible to feed the molding material into the intermediate segment 30.

In the case where the lower segment 20, the intermediate segment 30, and the upper segment 40 are combined, each of the first tapered surfaces 21a of the lower segment 20 faces a corresponding one of the second tapered surfaces 31a while not being in contact with the corresponding second tapered surface 31a, thereby forming a gate 27 around the entire perimeter of the bottom of each cavity 28. Each of the gates 27 serves as a space communicating with the corresponding cavity 28. Each gate 27 is formed of the corresponding first tapered surface 21a and the corresponding second tapered surface 31a in such a manner that the volume of each gate 27 decreases with decreasing distance from the corresponding cavity 28 and that the distance between each inner edge 21b and the corresponding edge 31b is the minimum dimension Lg, which is the dimension of a connecting portion 24 having the smallest volume in each gate 27, each inner edge 21b and the corresponding edge 31b constituting the connecting portion 24 through which each gate 27 communicates with the corresponding cavity 28. In this case, the lower segment 20 and the intermediate segment 30 are formed in such a manner that the minimum dimension Lg of each gate 27 is in the range of 0.01 mm to 0.5 mm (e.g., 0.2 mm). In the connecting portions 24 between the gates 27 and the cavities 28, an acute angle is formed by each first tapered surface 21a and the inner periphery of the corresponding projection 21, and an acute angle is formed by each second tapered surface 31a and the inner periphery of the corresponding cylindrical portion 31.

A runner 26 serving as a space configured to communicate with the gates 27 and the cavities 28 and feed a molding material thereinto is formed between the upper face of the lower segment 20 and the lower face 33 of the intermediate segment 30. As shown in FIGS. 1 and 2A, the runner 26 represented by a white plane in FIG. 2A is formed as a space communicating with and surrounding each gate 27. Unlike a typical runner configured to connect the plurality of molded articles 60 with rectangular lines, the runner 26 is formed in such a manner that the entire perimeter of each molded article 60 is connected to the corresponding connecting portion. The feed channel 34 is a space through which the inlet 44 communicates with the runner 26. The runner 26 communicates with an inlet portion consisting of the inlet 44 and the feed channel 34 and serves as a space through which the molding material can be fed from the inlet 44 into the gates 27. The runner 26 has steps 36 at communicating portions 25 through which the runner 26 communicates with the gates 27, each of the steps 36 being defined by the outer periphery of the corresponding cylindrical portions 31 and the corresponding second tapered surface 31a. The runner 26 has a height of Lh and a width of Lw. The shorter of the height Lh and the width Lw is defined as the minimum dimension Lr, which relates to the pressure loss of the molding material. In this case, the width Lw is defined as the minimum dimension Lr. The runner 26 is formed so as to have a minimum dimension Lr of 1 mm to 10 mm (e.g., 5 mm). Furthermore, in this case, the gates 27 and the runner 26 are formed by a combination of the lower segment 20 and the intermediate segment 30 so as to satisfy the expression (1):

$$Lr \geq 5 \times Lg \qquad \text{expression (1)}$$

where Lg represents the minimum dimension of each gate 27, and Lr represents the minimum dimension of the runner 26. That is, the minimum dimension Lg of each gate 27 is sufficiently smaller than the minimum dimension Lr of the runner 26.

In the case where the lower segment 20, the intermediate segment 30, and the upper segment 40 are combined, each of the third tapered surfaces 32a of the intermediate segment 30, the periphery of a corresponding one of the cylindrical portions 41 of the upper segment 40, and the lower face of the upper segment 40 face one another while not being in contact with one another, thereby forming a vent 35 defined by each third tapered surface 32a of the intermediate segment 30 and the corresponding lower face of the upper segment 40. Each of the vents 35 communicates with the entire perimeter of the top of a corresponding one of the cavities 28. Each of the vents 35 serves as a space configured to contain an extra amount of a molding material ejected from the corresponding cavity 28 after the cavity 28 is filled with the molding material. In each vent 35 has a connecting portion 46 communicating with the corresponding cavity 28. The intermediate segment 30 and the upper segment 40 are formed in such a manner that the distance Lu between the edge 32b of each intermediate segment 30 and the corner 41a of the corresponding cylindrical portion 41 is in the range of 0.01 mm to 0.5 mm (e.g., 0.2 mm). Each of the connecting portions 46 is defined by the corresponding third tapered surface 32a, the lower face of the upper segment 40, the periphery of the corresponding cylindrical portion 41, and the like in such a manner that the volume of the corresponding vent 35 decreases with decreasing distance from the connecting portion 46 with the connecting portion 46 having the smallest volume and the minimum width.

Figure 5A:
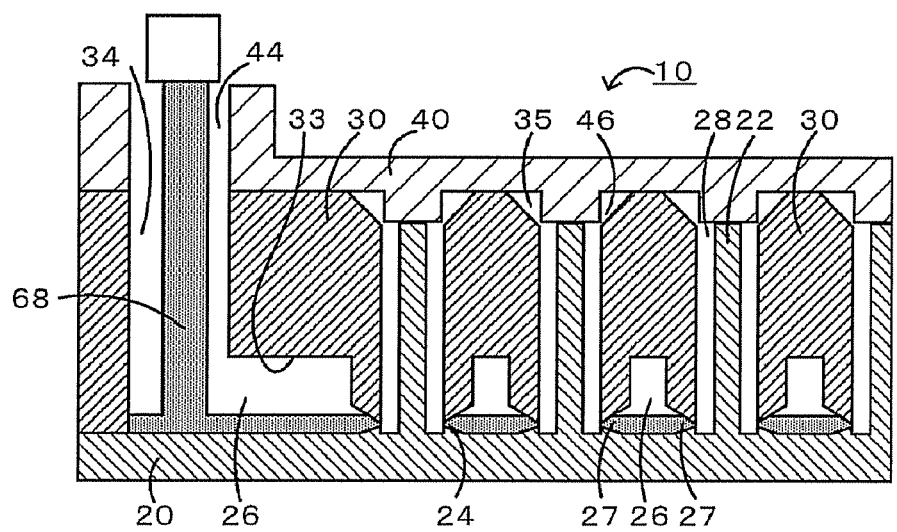
FIGS. 5A to 5C are explanatory drawings of the mold 10 when a molding material is fed into the mold 10.
Figure 5B:
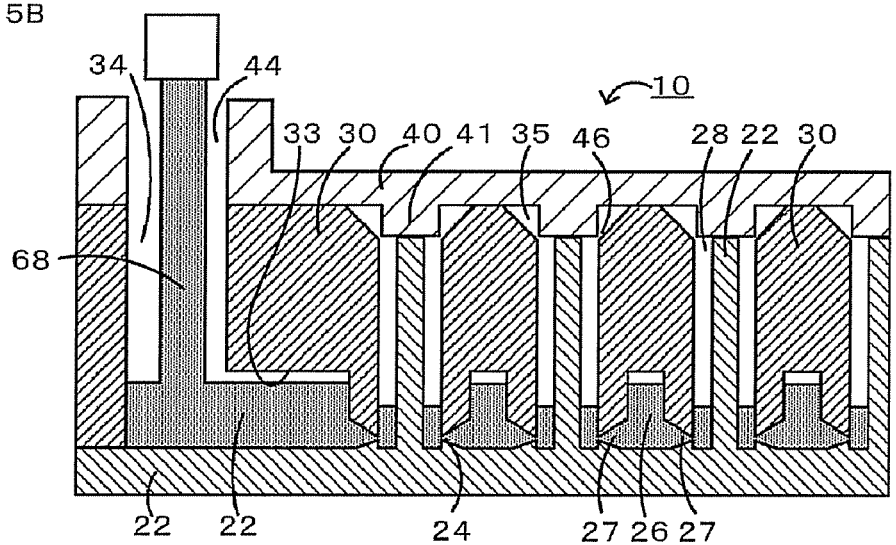
Figure 5C:
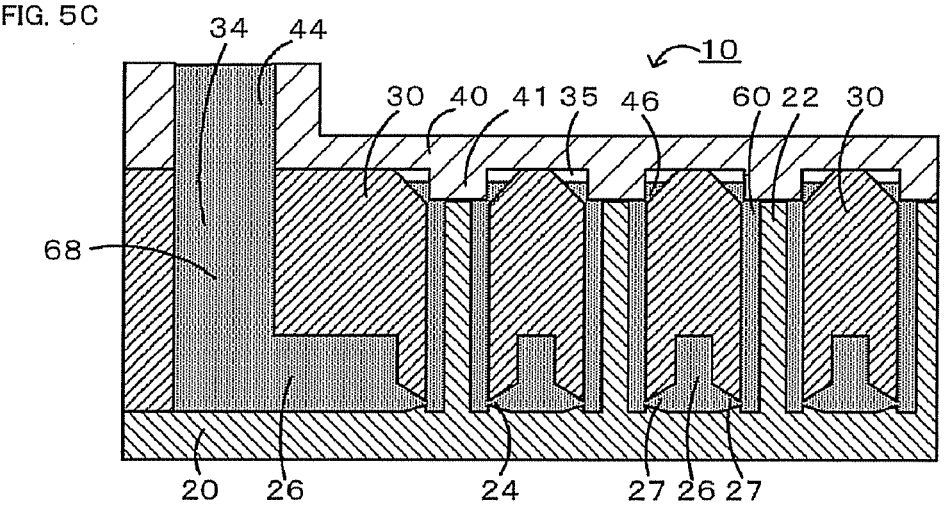
Figure 6A:
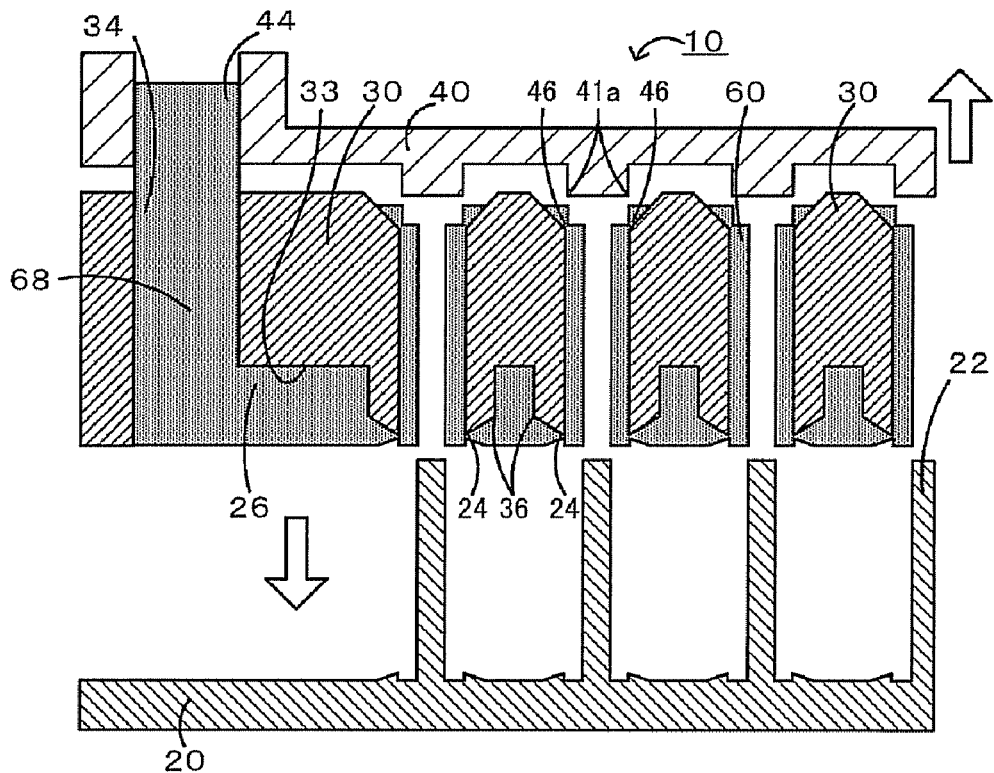
FIGS. 6A and 6B illustrate the release of the mold 10.
Figure 6B:
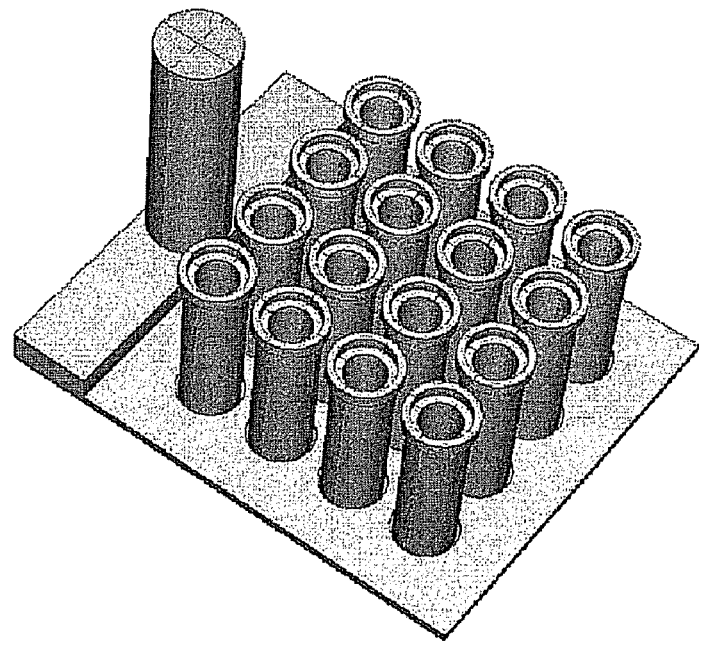

A method for forming the molded article 60 with the mold 10 will be described below. FIGS. 5A to 5C are explanatory drawings of the mold 10 when a molding material is fed into the mold 10. FIG. 5A is an explanatory drawing of the mold 10 immediately after the initiation of feeding. FIG. 5B is an explanatory drawing of the mold 10 in the course of feeding. FIG. 5C is an explanatory drawing of the mold 10 after the completion of feeding. FIGS. 6A and 6B illustrate the release of the mold 10. FIG. 6A illustrates the removal of the mold segments. FIG. 6B is a conceptual drawing of molded articles and solidified material portions after curing. A slurry as a molding material is prepared. An example of the slurry that can be used is a known self-curable slurry containing an inorganic powder and organic compounds, the self-curable slurry being solidified by a chemical reaction of the organic compounds, for example, a chemical reaction of a dispersion medium and a gelling agent or a chemical reaction of a gelling agent. Such a molding material contains a material powder, the dispersion medium, the gelling agent. The molding material may further contain a dispersant and a catalyst in order to adjust the viscosity and the solidifying reaction. In this case, a self-curable slurry containing an inorganic powder, such as an alumina powder or a carbon powder, as a main component and a gelling agent composed of a urethane organic compound is used as the molding material. However, various materials may be used as the molding material in place of the foregoing slurry.

The molding material is preferably prepared so as to satisfy at least one of the expressions (2) and (3). In this case, the molded articles 60 obtained in the cavities 28 can be easily and assuredly separated from solidified material portions obtained in the gates 27 (hereinafter, also referred to as "gate-solidified material portions") due to the shrinkage on curing. Let the cure shrinkage rate of the molding material be Rs, the tensile strength of the molded articles composed of the cured molding material be $\sigma s$ (Pa), the Young's modulus of the molded articles composed of the cured molding material be Em (Pa), the distance from the center of each molded article to the periphery of the corresponding gate 27 immediately after the molding material is fed into the mold 10 be Li (m), and the distance from the center of each molded article after the completion of curing to the periphery of the corresponding gate 27 on the assumption that the mold 10 does not restrain the molded articles be Lf (m). The strain $\epsilon s$ when the cured molding material (molded article) is broken by the tensile stress is given by the expression (4) from the Hooke's law. The cure shrinkage rate Rs is determined by forming a molded article for measurement of the cure shrinkage rate with a mold having a simple shape such as a cylinder for measurement of the cure shrinkage rate under conditions (e.g., the material and surface conditions of the mold, the molding material, curing time, and curing temperature) the same as those in the case of actual molding, subtracting a representative dimension R1 after curing from a representative dimension R0 before curing, and dividing the resulting difference by the representative dimension R0 before curing. In this case, since the molded articles 60 are in the form of a cylinder, the radius is defined as the representative dimension. For example, for a shape in which cylinders having different diameters are connected in the axial direction, a domical shape, a hemispherical shape, or a shape in which the through hole has different diameters between the upper portion and the lower portion, the radius of the largest portion is defined as the representative dimension. It is difficult to measure the distance Lf in the mold actually used; hence, the distance Lf is determined as described below. A disk-shaped mold having a radius of Li is prepared. A molding material slurry actually used is fed into the mold and cured to shrink under actual conditions (e.g., temperature and time). At this point, the radius of the disk-shaped molded article is defined as the distance Lf. The center of the molded article required for defining the distance Li is defined as a point through which the rotation axis passes when each of the molded articles is rotationally symmetric. In the case where each molded article is not rotationally symmetric, the center of the molded article is defined as the center of gravity of the cross section of the molded article 60 taken along a plane parallel to the connecting portion of the corresponding gate and including the gate. The distance Li is defined as the minimum distance between the center of the molded article and the periphery of the molded article. Similarly, the distance Lf is defined as the minimum distance between the center of the cured molded article and the periphery of the molded article. The strain $\epsilon s$ and the cure shrinkage rate Rs are defined by the following expressions (5) and (6) using the distances Li and Lf serving as dimensional parameters before and after curing. Elimination of the distances Li and Lf and the strain $\epsilon s$ from the expressions (4), (5), and (6) gives the expression (7). The cure shrinkage rate Rs obtained from the expression (7) is the minimum cure shrinkage rate required for the separation of the molded articles 60 from the gate-solidified material portions due to the shrinkage on curing. Thus, the conditional expression (2) indicating the cure shrinkage rate Rs required for separating the molded articles 60 from the gate-solidified material portions is obtained. From the viewpoint of achieving a sufficient change in dimension, the expression (3) is empirically derived. That is, two conditions for separating the molded articles in the cavities 28 from the gate-solidified material portions are derived. The expression (2) gives the condition for separating the molded articles in the cavities 28 from the gate-solidified material portions due to tensile fracture in the elastic deformation region when tension applied to the molded articles is maximized, for example, at the completion of the curing of the molding material. The expression (3) gives the condition for the separation due to tensile fracture caused by a sufficient change in dimension even when the shrinkage of an inadequately cured molding material proceeds to lead to plastic deformation. When at least one of the expressions (2) and (3) is satisfied, the molded articles cured in the cavities 28 can be more easily separated from solidified material portions cured in the gates 27 and the vents 35.

In this case, the molding material satisfying both expressions (2) and (3) is prepared by empirically adjusting a material powder, a dispersion medium, a gelling agent, a dispersant, a catalyst, and the like.

$Rs \geq \sigma s/(Em+\sigma s)$  expression (2)

$Li \times Rs \geq 50 \times 10^{-6}$  expression (3)

$\epsilon s = \sigma s/Em$  expression (4)

$\epsilon s = (Li-Lf)/Lf$  expression (5)

$Rs = (Li-Lf)/Li$  expression (6)

$Rs = \sigma s/(Em+\sigma s)$  expression (7)

The lower segment 20, the intermediate segment 30, and the upper segment 40 are combined. A molding slurry 68 is fed through the inlet 44 (see FIG. 5A). The molding material 68 spreads over the runner 26 having a relatively large volume. At this point, since the connecting portions 24 of the gates 27 are sufficiently narrow and formed in such a manner that the expression (1) is satisfied, the molding material 68 does not easily flow into the cavities 28 because of pressure loss. Thus, the molding material 68 is first filled into the runner 26. When the feed of the molding material 68 through the inlet 44 is continued, the molding slurry 68 is further filled into the runner 26. After a short delay due to pressure loss, the molding material 68 is filled into the cavities 28 through the connecting portions 24 (FIG. 5B). When the feed of the molding material 68 through the inlet 44 is further continued, all the cavities 28 are filled with the molding material 68. When the feed of the molding material 68 is still further continued, an extra amount of the molding material 68 is ejected from the connecting portions 46 into the vents 35. The feed of the molding material 68 is completed while the vents 35 contain the molding material 68 (FIG. 5C).

The slurry is subjected to primary curing by, for example, a predetermined chemical reaction at room temperature. If sufficient strength is not obtained after the primary curing at room temperature, for example, the curing reaction may proceed by heating or cooling the mold 10. After the completion of the predetermined primary curing, the lower segment 20 is removed from the intermediate segment 30 (see FIG. 6A). Then secondary curing may be performed, the secondary curing including promoting the curing reaction at a predetermined temperature (e.g., 130° C.) while evaporating an unnecessary liquid such as the dispersion medium. In this case, the upper segment 40 is not yet removed. At this point, the steps 36, which are in contact with the one end and the other end of each solidified material portion in the runner 26, limit the displacement of the solidified material portions in the runner 26. Thus, the gate-solidified material portions are moved toward the solidified material portions in the runner 26 due to shrinkage on curing. Each of the molded articles 60 in the cavities 28 shrinks toward its center. That is, each of the molded articles 60 in the cavities 28 and the corresponding gate-solidified material portion are moved away from each other. Thus, both ends of each connecting portion 24 are subjected to tensile stresses. As a result, the molded articles 60 in the cavities 28 are spontaneously separated from the gate-solidified material portions due to shrinkage on curing. Also for the molded articles 60 in the cavities 28 and solidified material portions in the vents 35 (hereinafter, also referred to as "vent-solidified material portions"), both ends of each connecting portion 46 are subjected to tensile stresses, thereby separating the molded articles 60 in the cavities 28 from the vent-solidified material portions due to shrinkage on curing. Therefore, the molded articles 60 are easily removed from the intermediate segment 30. FIG. 6B is a conceptual drawing of the molded articles 60 in the cavities 28, the gate-solidified material portions (runner-solidified material portions), and the vent-solidified material portions formed by curing the molding material with the mold 10. These molded articles and solidified material portions are obtained in separate pieces. The upper segment 40 is removed from the intermediate segment 30 (see FIG. 6A). Subsequently, the molded articles 60 are removed from the intermediate segment 30. The molded articles 60 are optionally dried to evaporate the residual dispersion medium at a drying temperature (e.g., 130° C.) for a predetermined period of time, thereby resulting in the molded articles 60 before sintering. The resulting green molded articles 60 are optionally calcined to remove organic materials therein and fired at a firing temperature in response to the components and the intended use. In this case, the upper segment 40 is removed from the intermediate segment 30 after the secondary curing. Alternatively, this operation may be performed after the primary curing.

In the case of using the mold 10 according to this embodiment as described in detail above, each of the gates 27 communicates with the perimeter of a corresponding one of the cavities 28 serving as spaces configured to form the molded articles 60. The self-curable molding material 68 having flowability is fed into the cavities 28 through the gates 27. The molding material 68 is fed into the entire perimeter of each cavity 28; hence, the mold 10 has a small number of dead ends and the like compared with, for example, the case where the molding material 68 is fed into each cavity 28 through a part of the cavity 28. Thus, it is possible to prevent the formation of bubbles left in the cavities when the molding material 68 is fed into the cavities 28. Each gate 27 and each vent 35 communicate with the entire perimeter of the corresponding cavity 28. Thus, for example, in the case where the stresses are relieved by plastic deformation in the course of shrinkage on curing, when the molded articles have a generally cylindrical shape, each of the molded articles is uniformly subjected to plastic deformation at its perimeter, so that the axis of each molded article is not easily changed. Each of the gates 27 is formed of the corresponding first tapered surface 21a and the corresponding second tapered surface 31a such that the volume of each gate 27 decreases with decreasing distance from the corresponding cavity 28, the connecting portion 24 of the gate 27 has the smallest volume in the gate 27, and the connecting portion 24 is formed so as to make an acute angle with the cavity 28. This makes it possible to easily separate the gate-solidified material portions from the molded articles 60 in the cavities 28 because of shrinkage on curing. When the lower segment 20 and the intermediate segment 30, which serve as a plurality of mold segments configured to form the cavities 28, are combined, each of the second tapered surfaces 31a face a corresponding one of the first tapered surfaces 21a. Thus, the gates 27 are easily formed so as to have a predetermined shape. Furthermore, after the molding material 68 is cured, the solidified material portions are easily removed by detaching the lower segment 20 from the intermediate segment 30. The plurality of cavities 28 and the plurality of gates 27 are formed. The molding material 68 can be fed into the plurality of gates 27. The runner 26 serving as a space is formed in such a manner that each of the gates 27 is formed along the perimeter of the corresponding cavity 28. Thus, the molding material 68 can be simultaneously fed into the plurality of cavities 28 through the runner 26 communicating the plurality of gates 27, thereby easily producing uniform molded articles 60. The runner 26 has the steps 36 at the communicating portions 25 communicating with the gates 27. When the molding material 68 in the mold is cured to shrink, the runner-solidified material portions are caught on the steps 36. This makes it possible to prevent any of the gate-solidified material portions from moving toward the corresponding cavity 28, thereby assuredly separating the molded articles 60 in the cavities 28 from the gate-solidified material portions due to shrinkage on curing. Moreover, the gates 27 and the runner 26 are formed so as to satisfy the expression (1). Thus, after the molding material 68 is rapidly fed into the entire runner 26, the molding material 68 can be simultaneously fed into the plurality of cavities 28, so that the more uniform molded articles 60 can be produced.

The vents 35 communicating with the cavities 28 are formed along the perimeters of the cavities 28. After the cavities 28 are filled with the molding material 68, an extra amount of the molding material 68 is ejected through the perimeters. This makes it possible to prevent the formation of bubbles left in the cavities 28 during the ejection. Furthermore, since the vents 35 are formed along the perimeters of the cavities 28, the symmetry of the shape and properties of the molded articles 60 having an axisymmetric cylindrical shape is not easily reduced during the formation of the molded articles 60. Furthermore, the vents 35 are formed in such a manner that each of the connecting portions 46 communicating with the cavities 28 has the smallest volume in the corresponding vent 35. This leads to easy separation of the solidified material portions in the vents 35 from the molded articles 60 in the cavities 28. The vents 35 are defined by the third tapered surfaces 32a in such a manner that the volume of each vent 35 decreases with decreasing distance from the corresponding cavity 28 and so as to have an acute angle. Thus, each of the molded articles 60 in the cavities 28 are moved away from the corresponding vent-solidified material portion during shrinkage on curing, thereby promoting the spontaneous separation of the connecting portions from the molded articles. This makes it possible to easily separate the molded articles 60 in the cavities 28 from the vent-solidified material portions. Each vent 35 is surrounded by the corresponding third tapered surface 32a, the periphery of the corresponding cylindrical portion 41, and the lower face of the upper segment 40. Thus, the vents 35 having a predetermined shape are easily formed. Furthermore, after the molding material 68 is cured, the solidified material portions are easily removed. The self-curable molding material 68 satisfying the expressions (2) and (3) is fed into the mold 10, and then the molding material 68 in the mold 10 is cured. When the expressions (2) and (3) are satisfied, it is possible to assuredly separate the molded articles in the cavities 28 from the gate-solidified material portions and the vent-solidified material portions due to shrinkage on curing.

It is to be understood that the present invention is not limited to the embodiment described above, and various embodiments within the scope of the technical field of the present invention can be carried out.

Figure 7A:
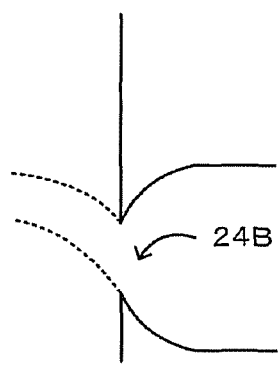
FIGS. 7A to 7C are explanatory drawings of other different-shaped connecting portions of gates 27.
Figure 7B:
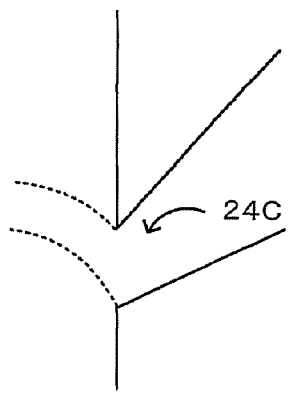
Figure 7C:
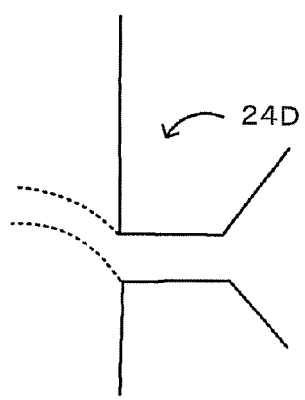

In the foregoing embodiment, the connecting portions 24 as shown in FIG. 1 are formed. Alternatively, connecting portions as shown in FIGS. 7A to 7C may be formed. FIGS. 7A to 7C are explanatory drawings of other different-shaped connecting portions of the gates 27. FIG. 7A is an explanatory drawing of a connecting portion 24B. FIG. 7B is an explanatory drawing of a connecting portion 24C. FIG. 7C is an explanatory drawing of a connecting portion 24D. For example, although each of the first and second tapered surfaces 21a and 31a is flat in the foregoing embodiment, the connecting portion 24B that is formed of curved surfaces and makes acute angles with the cavity may be used. While each of the first and second tapered surfaces 21a and 31a makes an acute angle with the cavity in the foregoing embodiment, the connecting portion 24C in which one of the first and second tapered surfaces 21a and 31a makes an obtuse angle with the cavity may be used. Alternatively, the connecting portion 24D that does not make an acute angle with the cavity without using a tapered surface may be used. Furthermore, each of the connecting portions 24 may not have the smallest volume in the corresponding gate. Even in this case, the molding material 68 is fed into the perimeters of the cavities 28 through the gates 27, thus making it possible to prevent the formation of bubbles left in the cavities 28 in feeding the molding material. In the case of the molded articles having an axisymmetric shape, it is possible to prevent the reduction in the symmetry of the shape and properties.

Figure 8A:
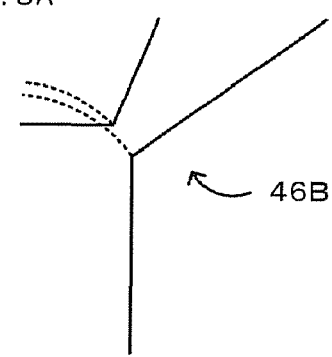
FIGS. 8A to 8E are explanatory drawings of other different-shaped connecting portions of vents 35.
Figure 8B:
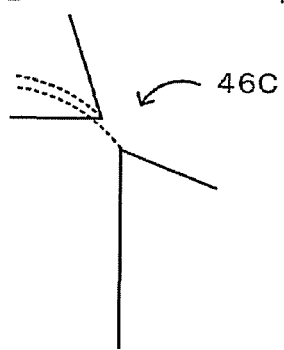
Figure 8C:
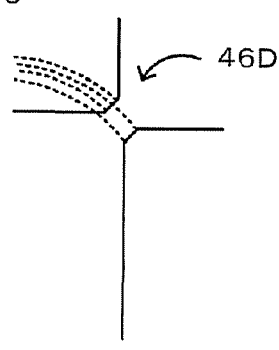
Figure 8D:
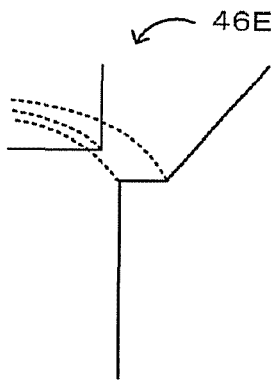
Figure 8E:
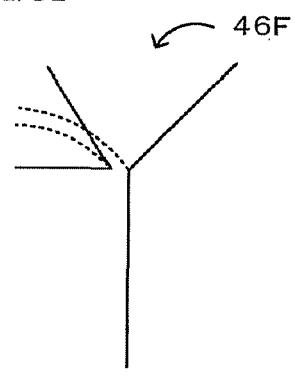

In the foregoing embodiment, the connecting portions 46 as shown in FIG. 1 are formed. Alternatively, connecting portions as shown in FIGS. 8A to 8E may be used. FIGS. 8A to 8E are explanatory drawings of other different-shaped connecting portions of the vents 35. FIG. 8A is an explanatory drawing of a connecting portion 46B. FIG. 8B is an explanatory drawing of a connecting portion 46C. FIG. 8C is an explanatory drawing of a connecting portion 46D. FIG. 8D is an explanatory drawing of a connecting portion 46E. FIG. 8E is an explanatory drawing of a connecting portion 46F. Each of the corners 41a has a right angle in the foregoing embodiment. Alternatively, the connecting portion 46B having an obtuse angle may be used. The square corners 41a and the obtuse-angled edges 32b are used in the foregoing embodiment. Alternatively, the connecting portion 46C formed of the acute-angled corner 41a and the acute-angled edge 32b may be used. The connecting portion 46D without using a tapered surface may be used. The connecting portion 46E in which the edge 32b of the third tapered surface 32a has a right angle may be used. The vent mark 66 is formed on the top and periphery of each molded article 60 in the foregoing embodiment. Alternatively, the connecting portion 46F in which the corner 41a is located at the same level as the edge 32b to separate the molded article 60 on the top side may be used. Furthermore, these may be appropriately combined. The vents 35 may be formed so as to be face-connected as in the runner 26.

Figure 9A:
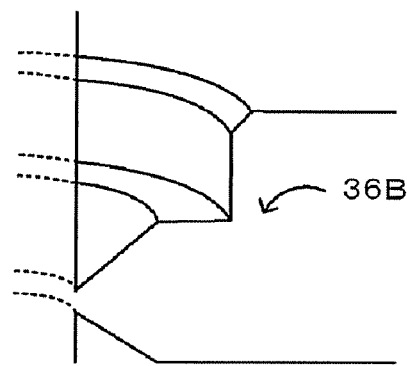
FIGS. 9A to 9C are explanatory drawings of other different-shaped steps.
Figure 9B:
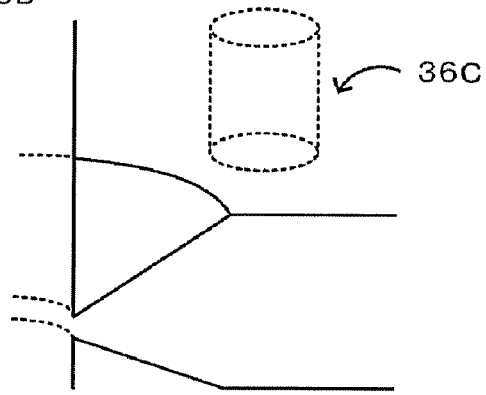
Figure 9C:
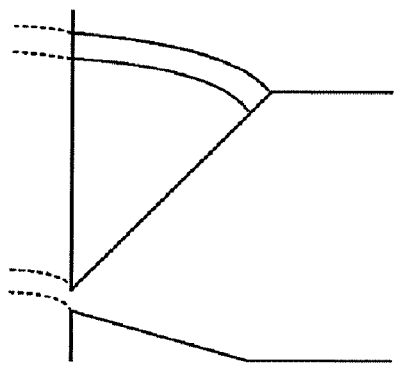
Figure 10A:
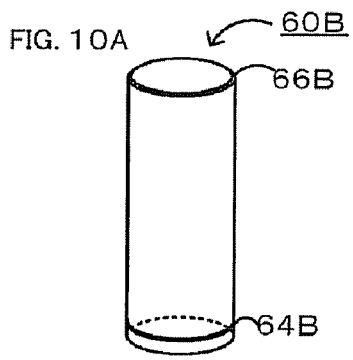
FIGS. 10A to 10G are explanatory drawings of exemplary other different-shaped molded articles.
Figure 10B:
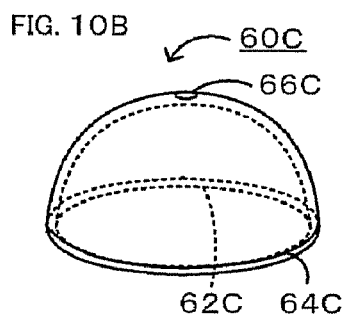
Figure 10C:
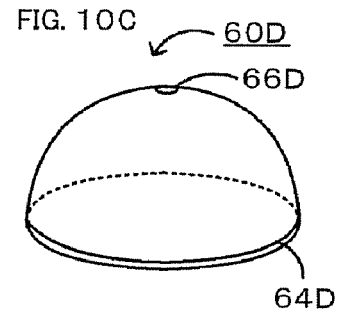
Figure 10D:
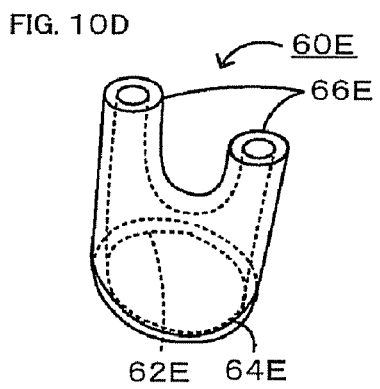
Figure 10E:
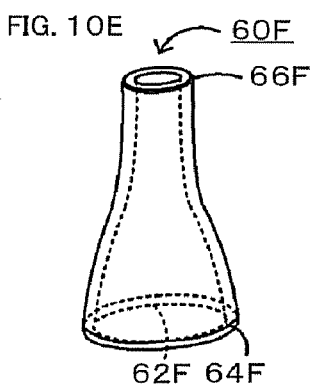
Figure 10F:
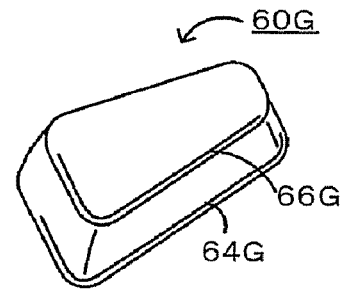
Figure 10G:
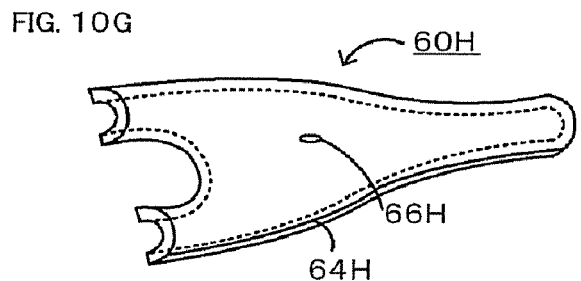

In the foregoing embodiment, the steps 36 shown in FIG. 1 are used. Alternatively, structures as shown in FIGS. 9A to 9C may be used. FIGS. 9A to 9C are explanatory drawings of other different-shaped steps. FIG. 9A is an explanatory drawing of a step 36B. FIG. 9B is an explanatory drawing of a step 36C. FIG. 9C is an explanatory drawing of a structure without a step. Each of the steps is formed of a corresponding one of the second tapered surfaces 31a and the periphery of the corresponding cylindrical portion 31 in the foregoing embodiment. For example, the step 36B in which the second tapered surface 31a is connected to the periphery of the cylindrical portion 31 through one or more horizontal planes may be used. The step 36c in which a hole having a bottom is arranged in the lower face 33 may be used. Alternatively, the steps 36 may be eliminated. Even in this case, it is possible to prevent the formation of bubbles left in the cavities 28 during the feeding of the molding material. In the case of the molded articles having an axisymmetric shape, it is possible to prevent the reduction in the symmetry of the shape and properties.

In the foregoing embodiment, the molded articles 60 having a cylindrical shape are formed with the mold 10. The shape of the molded articles is not limited thereto. The molded articles may have any shape. Specifically, the molded articles may not be a rotationally symmetric or a hollow. FIGS. 10A to 10G are explanatory drawings of other different-shaped molded articles. For example, a solid molded article 60B may be formed. A domical molded article 60C may be formed. A hemispherical molded article 60D may be formed. A hollow molded article 60E having two legs may be formed. A molded article 60F having a through hole with different diameters between the upper portion and the lower portion thereof may be formed. A rectangular molded article 60G may be formed. A molded article 60H which is a half of a hollow two-legged member may be formed. Gate marks 64B to 64H are formed on the respective lower portions of the molded articles 60B to 60H. Vent marks 66B to 66H are formed on the respective upper portions of the molded articles 60B to 60H. A mold including the cavities 28, the runner 26, the gates 27, and the vents 35 capable of forming the molded articles having such a shape may be used.

In the foregoing embodiment, all the expressions (1) to (3) are satisfied. At least one of the expressions (1) to (3) may not be satisfied. Furthermore, none of the expressions (1) to (3) may be satisfied. Even when none of the expressions (1) to (3) is satisfied, it is possible to prevent the formation of bubbles left in the cavities 28 in feeding the molding material 68 because the molding material 68 is fed into the perimeters of the cavities 28 through the gates 27. In the foregoing embodiment, the mold has three segments: the lower segment 20, the intermediate segment 30, and the upper segment 40. Alternatively, the mold may have two or more segments. Each of the gates 27 and each of the vents 35 may not be defined by two or more segments facing each other. Furthermore, each gate 27 and each vent 35 may not be defined by tapered surfaces.

In the foregoing embodiment, each gate 27 and each vent 35 communicate with the entire perimeter of the corresponding cavity 28. The vents 35 may be eliminated. Even in this case, it is possible to prevent the formation of bubbles left in the cavities 28 in feeding the molded material. In the foregoing embodiment, the mold 10 capable of forming the plurality of molded articles 60 is used. Alternatively, to form a single molded article 60, the runner 26 may be eliminated. In the foregoing embodiment, each gate 27 communicates with the entire perimeter of the corresponding cavity 28. When the gate communicates with substantially the entire perimeter, a portion not communicating with the gate may be present. The same is true for the vents 35.

EXAMPLE

Example 1

In this example, the molded articles 60 were produced with the mold 10 shown in FIG. 1. A molding material contained an alumina powder serving as an inorganic powder, an organic dibasic acid ester serving as a dispersion medium, an isocyanate and a polyol serving as resin raw materials, a dispersant, and a catalyst. The molding material had a viscosity of 0.1 Pa·s. The gates 27 had a minimum dimension Lg of 0.2 (mm). The runner 26 had a minimum dimension Lr of 2.2 (mm). The molding material had a cure shrinkage Rs of 0.04. The tensile strength σs was $1 \times 10^{-6}$ (Pa). The Young's modulus Em was $3 \times 10^{7}$ (Pa). The distance Li was 0.0080 (m). The distance Lf was 0.0077 (m). That is, all the expressions (1) to (3) were satisfied. The distances Li and Lf were determined by the methods described above. The molding material was fed into the inlet 44 of the mold 10. The molding material was allowed to stand at room temperature for 60 minutes to perform a primary curing. After the removal of the lower segment 20, the molding material was subjected to a secondary curing in a dryer at 130° C. for 1 hour. At this point, shrinkage on curing leads to the spontaneous separation of solidified material portions in the runner 26 and the gates 27 from the molded articles in the cavities 28 and the spontaneous separation of the molded articles 60 from the cavities 28. After the mold 10 was taken out from the dryer, the upper segment 40 was detached. The visual check of the molded articles 60 demonstrated that bubbles, uneven molding, voids, and underfilling were not observed. The molded articles 60 were easily separated from the gates, the runner, and the vents while bubble inclusion was prevented. Evaluation of ends of each of the molded articles 60 with a measuring microscope showed that the inner circumference and the outer circumference had no strain and that the molded article had a uniform thickness.

The present application claims priority from Japanese Patent Application No. 2007-262361 filed on Oct. 5, 2007, the contents of which including the specification, the drawings, and the claims disclosed therein are hereby fully incorporated by reference into this application.

What is claimed is:

1. A mold configured to form at least one molded article having a predetermined shape by injecting a flowable self-curable molding material, comprising:

a cavity serving as a space configured to form a molded article by injecting the molding material;

a gate that traverses an entire perimeter of the bottom of the cavity and serving as a space configured to feed the cavity with the molding material;

a vent connecting portion that traverses an entire perimeter of the top of the cavity, wherein the vent connecting portion is formed to make an acute angle with the top of the cavity;

a vent traversing the entirety of the vent connecting portion and serving as a space configured to partially discharge the molding material from the top of the cavity, wherein the vent openly communicates with the top of the cavity through the vent connecting portion; and an inlet arranged at a position higher than the top of the cavity and configured to feed the gate with the molding material.

2. The mold according to claim 1, wherein the connecting portion is formed so as to have the smallest volume in the vent.

3. The mold according to claim 1, wherein the vent is formed of a tapered surface such that the volume of the vent decreases with decreasing distance from the cavity.

4. The mold according to claim 1, wherein the mold includes a plurality of segments configured to form the cavity when the plurality of segments are combined, and wherein when the plurality of segments are combined to form the cavity, the vent is defined by a surface of at least one of the plurality of segments and a surface of another segment facing each other.

5. The mold according to claim 1, wherein the gate has a gate connecting portion that communicates with the cavity, and the gate connecting portion is formed so as to have the smallest volume in the gate.

6. The mold according to claim 1, wherein the gate is formed of a tapered surface such that the volume of the gate decreases with decreasing distance from the cavity.

7. The mold according to claim 1, wherein the gate has a gate connecting portion that communicates with the cavity, the gate connecting portion being formed so as to make an acute angle with the cavity.

8. The mold according to claim 1, wherein the mold includes a plurality of segments configured to form the cavity when the plurality of segments are combined, and wherein when the plurality of segments are combined to form the cavity, the gate is defined by a surface of at least one of the plurality of segments and a surface of another segment facing each other.

9. The mold according to claim 1, further comprising:

a runner serving as a space through which the molding material is fed into the gate, wherein the runner communicates with the whole or part of the perimeter of the gate.

10. The mold according to claim 9, wherein the runner has a step at a communicating portion at which the runner communicates with the gate.

11. The mold according to claim 9, wherein the gate and the runner are formed so as to satisfy the expression (1):

$$Lr \geq 5 \times Lg \qquad \text{expression (1)}$$

where $Lg$ (mm) represents a dimension of the gate, and $Lr$ (mm) represents a dimension of the runner.

12. The mold according to claim 11, wherein the gate and the runner are formed so as to satisfy at least one of the following requirements: the gate having a dimension $Lg$ of 0.5 mm or less, and the runner having a dimension $Lr$ of 1 mm or more.

13. A method for molding an article with a self-curable molding material and a mold, comprising the steps of:

feeding a molding material satisfying the following expression (2) into the mold according to claim 1, $$Rs \geq \sigma s/(Em+\sigma s) \qquad \text{expression (2)}$$

where $Rs$ represents the cure shrinkage rate of the molding material, $\sigma s$ (Pa) represents the tensile strength of the molded article composed of the cured molding material, and $Em$ (Pa) represents the Young's modulus of the molded articles composed of the cured molding material; and curing the molding material in the mold.

14. The method according to claim 13, wherein in the feeding step, the molding material further satisfying the following expression (3) is fed into the mold, $$Li \times Rs \geq 50 \times 10^{-6} \qquad \text{expression (3)}$$

where $Li$ (m) represents the distance from the center of the molded article to the periphery of the gate immediately after the molding material is fed into the mold.

15. A method for molding an article with a self-curable molding material and a mold, comprising the steps of:

feeding a molding material satisfying the following expression (3) into the mold according to claim 1, $$Li \times Rs \geq 50 \times 10^{-6} \qquad \text{expression (3)}$$

where $Rs$ represents the cure shrinkage rate of the molding material, and $Li$ (m) represents the distance from the center of the molded article to the periphery of the gate immediately after the molding material is fed into the mold; and curing the molding material in the mold.

* * * * *